Dec. 26, 1967     P. H. GORDON ETAL     3,360,138
APPARATUS FOR LOADING WORKPIECES INTO WELDING MACHINES
Filed Sept. 7, 1965     2 Sheets-Sheet 2
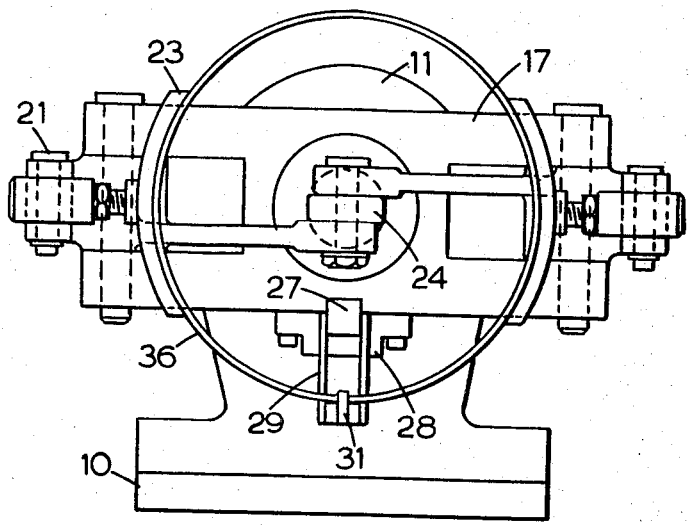
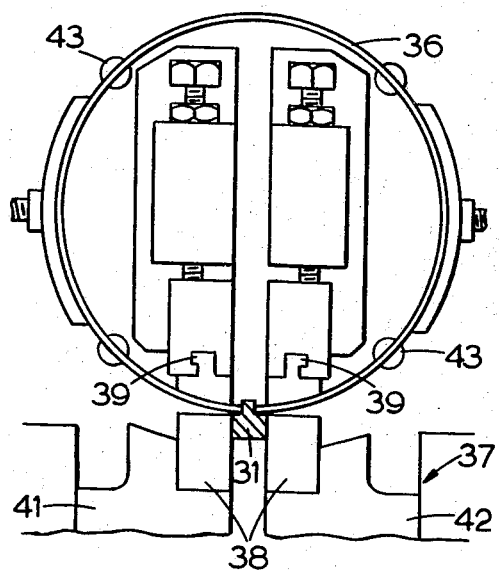
Inventors
Patrick Hunter Gordon
Jack Nortcliffe
Stevens, Davis, Miller & Mosher
Attorneys

United States Patent Office 3,360,138
Patented Dec. 26, 1967

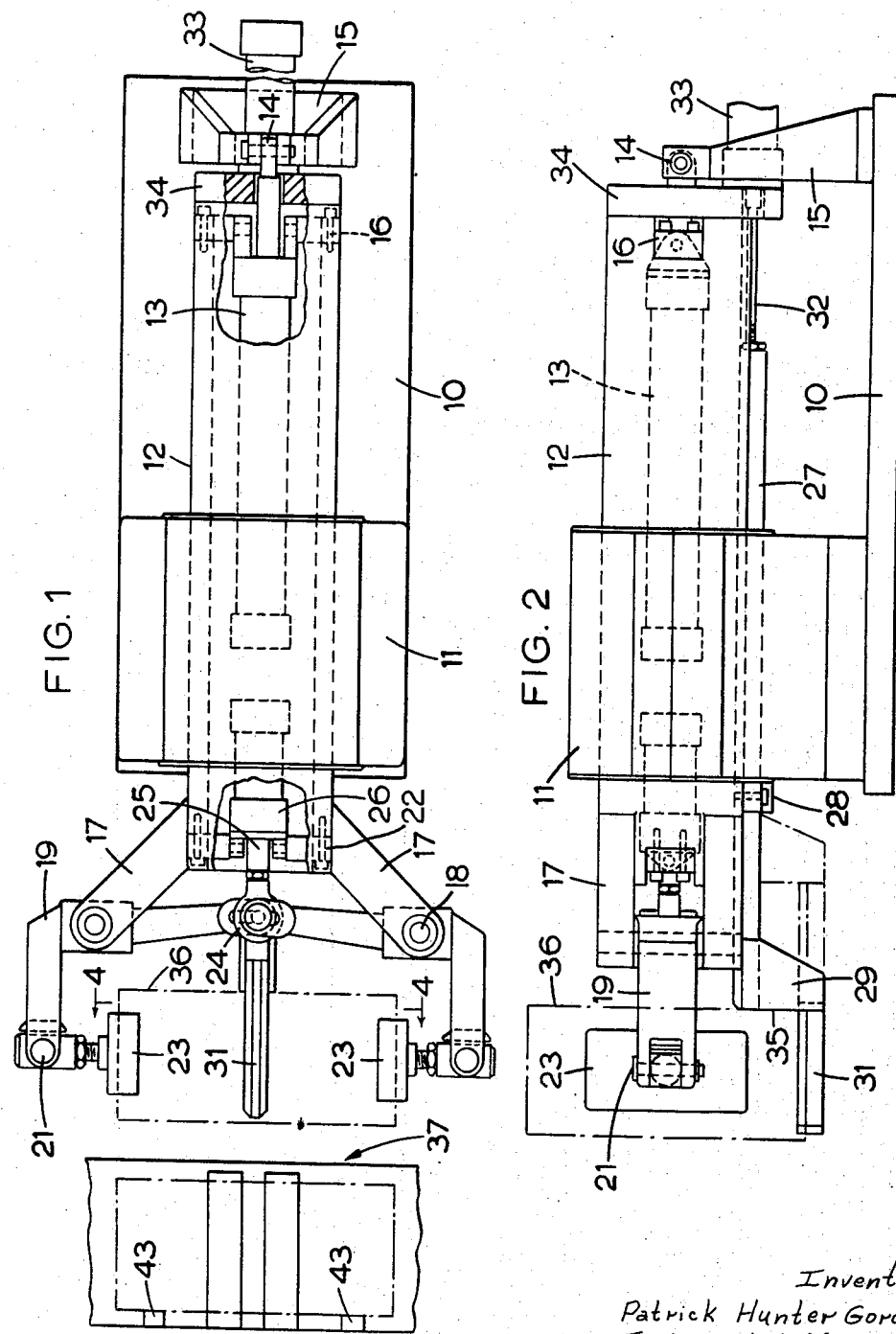

3,360,138
APPARATUS FOR LOADING WORKPIECES INTO WELDING MACHINES
Patrick Hunter Gordon and Jack Nortcliffe, Inverness, Scotland, assignors to A.I. Welders Limited, Inverness, Scotland
Filed Sept. 7, 1965, Ser. No. 485,371
Claims priority, application Great Britain, Sept. 4, 1964, 36,376/64
6 Claims. (Cl. 214—1)

ABSTRACT OF THE DISCLOSURE

A loading machine for inserting a pre-curved metal band into a flash-butt welding machine for forming a welded joint between the ends of said band, wherein a slide member is movable in a supporting structure and carries a locating bar having a projection directed radially inwardly with respect to said band to space and position the ends of the band in the plane thereof, clamping means being carried by said slide member and adapted to act externally on the band to hold it in said position.

---

This invention relates to apparatus for loading workpieces into welding machines and more particularly to apparatus for loading pre-curved metal bands into flash-butt welding machines in which their ends are welded together to form wheel rims.

It is essential that the bands be placed in the welding machines in the correct position, so that the side edges are in planes parallel to the direction of relative movement of the two ends during the welding operation, and the ends are correctly placed between the clamps which secure them to the fixed and moving platens. It is customary at the present time to load and unload the welding machines by hand, two men being required for each welding machine.

It is the object of the present invention to provide apparatus which will insert the bands automatically into the welding machine and will ensure their correct positioning therein.

According to the present invention, a loading machine for inserting a pre-curved metal band into a flash-butt welding machine for forming a welded joint between the ends of said band comprises a supporting structure and a slide member movable in said supporting structure, said slide member carrying locating means to space and position the ends of the band, and clamping means acting externally on the band to hold it in a predetermined position with its ends engaging the said locating means.

The clamping means may comprise arcuate clamping jaws, concave on their inner sides, the said clamping jaws being mounted for pivotal movement about vertical axes on a pair of levers, themselves pivotally mounted to move about vertical axes, clamp operating means being provided which act on the said levers to urge the clamping jaws inwardly against a band positioned therebetween.

The invention is hereinafter described with reference to the accompanying drawings, in which:

FIGURE 1 is a plan view of one form of loading machine according to the invention parts being broken away and a part of a welding machine to be loaded also being shown;

FIGURE 2 is a side elevation of the loading machine shown in FIGURE 1;

FIGURE 3 is an end view of the loading machine as viewed from the left-hand side of FIGURE 1; and FIGURE 4 is a section on the line 4—4 of FIGURE 1 showing the positions of the loading machine clamps and the welding machine clamps when a metal band held by the loading machine is inserted in a welding machine.

Referring to FIGURES 1 to 3 of the drawings, a base 10 carries a bearing 11 for a tubular slide member 12. A fluid pressure ram-and-cylinder device 13 mounted inside the slide member 12 has its ram anchored at 14 to a fixed support 15 standing up from the base 10, the cylinder of the device 13 being pivotally coupled by trunnions 16 to the slide member. The ram-and-cylinder device 13 is double-acting, and fluid pressure acting therein moves the slide member 12 longitudinally through the bearing 11 in one direction or the other, depending on the end of the cylinder to which the fluid pressure is admitted.

At its forward end, the slide member 12 has fixed to it two horizontally divergent arms 17 at the extremities of which are mounted, about vertical pivots 18, a pair of bellcrank levers 19. One arm of each lever 19 projects forwardly from the slide member and has mounted on it by means of a vertical pivot bearing 21, one of two arcuate clamping jaws 23 which are both concave on their inner sides. The other arms of the two levers 19 extend inwardly towards each other and are coupled at their inner ends at 24, to the ram 25 of a second double-acting fluid pressure ram-and-cylinder device 26 the cylinder of which is pivotally coupled by trunnions 22, to the slide member 12. The ram-and-cylinder device 26 is thus operable to move the clamping jaws 23 towards and away from each other.

A bar 27 extending longitudinally below the slide member 12 and slidably supported thereon by a guide 28 carries a bracket 29 on which is mounted a locating member 31 of inverted T-shape in cross section, the locating member 31, in its operative position, extending forwardly from the guide 28 below and between the clamping jaws 23. The bar 27, at its rear end, is coupled to a rod 32 which is in turn connected to the ram of a fluid-pressure ram-and-cylinder device 33 the cylinder of which is fixedly mounted on a downward extension of an end plate 34 fixed to the rear end of the slide member 12. The bearing support 11 is cut away to allow passage through it of the bar 27.

The ram-and-cylinder device 33 is operable to retract the locating member 31 to a position, shown in chain dotted lines in FIGURE 2, in which it is wholly behind the clamping jaws, and to return it to its forward position.

The front edge 35 of the bracket 29 serves as an abutment for the rear side edge of a band, shown in chain dotted lines at 36, when the said band is supported in the clamping jaws, so that, by pushing the said band against this abutment, the band can be positioned longitudinally with respect to the slide member 12.

Part of a flash-butt resistance welding machine for welding the ends of pre-curved metal bands together in the manufacture of wheel rims is shown at 37 in FIGURES 1 and 4, the welding machine including, as shown in FIGURE 4, two pairs of clamping jaws each comprising a relatively fixed jaw 38 and relatively movable jaw 39, one pair of jaws being mounted on a fixed platen 41 and the other pair on a movable platen 42. The jaw 39 of each pair lies inside a band 36 when the latter is in position in the welding machine, and, especially if the band is of relatively small diameter, the jaws 39 occupy a very large proportion of the space inside the band. It is therefore necessary that a loading machine used to load the welding machine should hold the band externally. A further essential requirement is that the gap in the band must be accurately located circumferentially so as to lie centrally between the two pairs of clamping jaws. Both of these requirements are met by the loading machine according to the present invention.

The welding machine carries, as shown in FIGURES 1 and 4, a plurality of abutments 43 against which a band 36 is urged when inserted in the machine, so that the side edges of the band are located in planes perpendicular to the axes of the slide member, and the band is properly positioned in the welding machine.

The fluid pressure ram-and-cylinder devices, which may be operated by air or liquid, are supplied with pressure fluid from any suitable source through valves which may be controlled manually, or may be controlled automatically in a predetermined sequence. The fluid pressure supply source and control valves form no part of the present invention, and are not illustrated in the drawings or described in detail.

The loading machine according to the invention operates in the following manner.

The loading machine is set up so that the slide member 12 is opposite the working position of the welding machine. With the slide member 12 retracted as shown in the drawings, the locating member 31 extended, and the jaws 23 open, a pre-curved band 36 is placed between the said jaws with its ends resting on the horizontally-extending limbs of the locating member 31. The jaws 23 are then closed by fluid pressure acting in the ram-and-cylinder device 26, to grip the band 36 and press its ends against the upright limb of the locating member.

The slide member 12 is then advanced by fluid pressure acting in the ram-and-cylinder device 13 to push the band 36 into the welding machine where it engages the abutments 43 and is correctly located thereby as regards the planes of its edges, the locating member 31 positioning the ends of the band accurately with relation to the welding machine clamps. The welding machine clamps are then closed, and the jaws 23 of the loading machine are released, but the slide member of the loading machine is not withdrawn. The locating member 31 is, however, withdrawn from its position between the ends of the band so that the said ends can be brought together for welding by movement of the moving platen of the welding machine relative to the fixed platen.

When the welding operation is completed, the jaws of the loading machine are re-engaged with the band to withdraw it from the welding machine.

What is claimed is:

1. A loading machine for inserting a pre-curved metal band into a flash-butt welding machine for forming a welded joint between the ends of said band, said loading machine comprising a supporting structure, a slide member movable in said supporting structure, a locating bar carried by said slide member and having a projection directed radially inwardly with respect to said band to space and position said ends in the plane of said band, and clamping means carried by said slide member and adapted to act externally on the band to hold it in said position.

2. A loading machine according to claim 1, wherein said bar has an inverted T-shaped cross-section, the horizontally extending portion of which forms an initial resting surface for the ends of said band before clamping.

3. A loading machine according to claim 1 wherein said clamping means comprise a pair of arms mounted on said slide member, a pair of levers pivotally mounted to said arms, an arcuate clamping jaw pivotally mounted to one end of each of said levers, and clamp operating means carried by said slide member and acting on said levers to urge the clamping jaws inwardly against a band positioned therebetween.

4. A loading machine according to claim 3 wherein said clamp operating means comprises a fluid pressure ram-and-cylinder device and wherein said levers are bell-crank levers on one arm of each of which of said clamping jaws is mounted, the other arms of said bell-crank levers being connected to said ram.

5. A loading machine according to claim 1 further comprising a second fluid pressure ram-and-cylinder device to move the slide member relative to the supporting structure.

6. A loading machine according to claim 2 wherein the locating means is movable longitudinally relative to said clamping jaws so that it can be withdrawn from its locating position while said jaws remain in engagement with a band supported thereby.

References Cited

UNITED STATES PATENTS

| | | | |
|---|---|---|---|
| 479,883 | 8/1892 | James | 214—27 |
| 2,226,650 | 12/1940 | York | 294—113 X |
| 2,871,052 | 1/1959 | Neher | 294—67 X |
| 3,051,327 | 8/1962 | Goodell et al. | 214—1 |
| 3,061,115 | 10/1962 | Sharpe | 214—1 |
| 3,212,650 | 10/1965 | Sharpe et al. | 214—1 |

GERALD M. FORLENZA, *Primary Examiner.*

MARVIN A. CHAMPION, *Examiner.*

G. F. ABRAHAM, *Assistant Examiner.*